US009765865B2

(12) United States Patent
Pansky et al.

(10) Patent No.: US 9,765,865 B2
(45) Date of Patent: Sep. 19, 2017

(54) VARIABLE LINEAR MOTOR

(71) Applicant: MEDINOL LTD., Tel Aviv (IL)

(72) Inventors: Amir Pansky, Atlit (IL); Eyal Ben-Moshe, Ramat-Gan (IL); Ben Zion Spector, Tel Mond (IL)

(73) Assignee: Medinol Ltd., Tel Aviv (IL)

( * ) Notice: Subject to any disclaimer, the term of this patent is extended or adjusted under 35 U.S.C. 154(b) by 1193 days.

(21) Appl. No.: 13/761,507

(22) Filed: Feb. 7, 2013

(65) Prior Publication Data

US 2014/0216185 A1 Aug. 7, 2014

(51) Int. Cl.
*F16H 21/22* (2006.01)
*F16H 21/20* (2006.01)

(52) U.S. Cl.
CPC ........ *F16H 21/20* (2013.01); *Y10T 74/18208* (2015.01)

(58) Field of Classification Search
CPC ............... F16H 21/20; F16C 3/28; F16C 7/06
USPC ....... 74/44; 123/48 B, 78 E, 78 BA; 92/12.2, 92/84
See application file for complete search history.

(56) References Cited

U.S. PATENT DOCUMENTS 2,693,157 A * 11/1954 Georgeff ................ B21D 24/12
                                                      72/417
3,162,131 A    12/1964 Clark
3,237,829 A *  3/1966 Muntwyler ............ B23D 25/04
                                                      225/103
3,264,886 A *  8/1966 Albert ....................... B30B 1/06
                                                        74/40
3,487,703 A *  1/1970 Obendorfer ........... B21B 21/005
                                                      277/507
3,951,003 A *  4/1976 White ....................... F16C 3/28
                                                        74/25

(Continued)

FOREIGN PATENT DOCUMENTS

CN      101230902       7/2008
DE       29 00 373      7/1979

(Continued)

OTHER PUBLICATIONS

International Search Report from corresponding PCT Application No. PCT/IB/2014/001963 dated Feb. 26, 2015, 9 pages.

*Primary Examiner* — Zakaria Elahmadi
(74) *Attorney, Agent, or Firm* — Cadwalader, Wickersham & Taft LLP

(57) ABSTRACT

Device and method for enabling independent tuning of frequency and amplitude of a reverse crankshaft motor. The reverse crankshaft motor provides periodic reciprocating motion based on periodic rotational motion from a rotational motor. The reverse crankshaft motor includes a crankshaft structure having first and second frames with a third axle arranged between them and connected to them by hinges. An amplituder is affixed to the third axle and may communicate with an external device. As the first and second frames move toward or apart from each other, the third axle moves radially toward or away from a central axis of the crankshaft structure. The position of the third axle determines the amplitude of the periodic reciprocating motion of the amplituder. By adjusting the position of the first and second frames, the operator may adjust the amplitude independently from the frequency of the periodic rotational motion supplied by the rotational motor.

18 Claims, 5 Drawing Sheets

(56) References Cited

U.S. PATENT DOCUMENTS

| | | | |
|---|---|---|---|
| 4,041,800 A | | 8/1977 | Sato et al. |
| 4,189,958 A | * | 2/1980 | Braun ................ F01B 1/12 123/46 R |
| 5,467,687 A | * | 11/1995 | Habegger ........ F04B 39/0022 384/11 |
| 5,904,044 A | * | 5/1999 | White ................ F01B 3/00 123/48 B |
| 6,006,619 A | * | 12/1999 | Gindentuller .......... F02B 75/32 123/197.1 |
| 7,013,849 B2 | * | 3/2006 | Rabhi ................ F01B 9/047 123/48 B |
| 7,121,074 B1 | * | 10/2006 | Regier ................ A01D 34/305 56/296 |
| 8,667,934 B1 | * | 3/2014 | Woo ................ F02B 75/04 123/48 B |
| 2002/0043228 A1 | * | 4/2002 | Moteki ................ F02B 75/045 123/78 E |
| 2002/0117129 A1 | * | 8/2002 | Aoyama ................ F01B 9/02 123/48 B |
| 2004/0089252 A1 | * | 5/2004 | Park ................ F02B 75/048 123/48 B |
| 2006/0081122 A1 | * | 4/2006 | Choi ................ F16H 21/20 92/129 |
| 2006/0285980 A1 | * | 12/2006 | Kim ................ F04B 49/126 417/221 |
| 2010/0236400 A1 | * | 9/2010 | Duke ................ F01B 3/0002 92/12.2 |
| 2012/0073538 A1 | * | 3/2012 | Hofbauer ................ F01B 7/08 123/197.4 |
| 2012/0222505 A1 | * | 9/2012 | Almansor ................ F01B 9/042 74/44 |
| 2012/0291755 A1 | * | 11/2012 | Perez ................ F02B 75/048 123/48 B |
| 2014/0326219 A1 | * | 11/2014 | Blackstock ........ F02B 75/047 123/48 B |

FOREIGN PATENT DOCUMENTS

| | | |
|---|---|---|
| DE | 38 35 811 | 5/1990 |
| GB | 2 012 017 | 7/1979 |
| RU | 2 011 847 C1 | 4/1994 |
| RU | 2 072 436 C1 | 1/1997 |

* cited by examiner

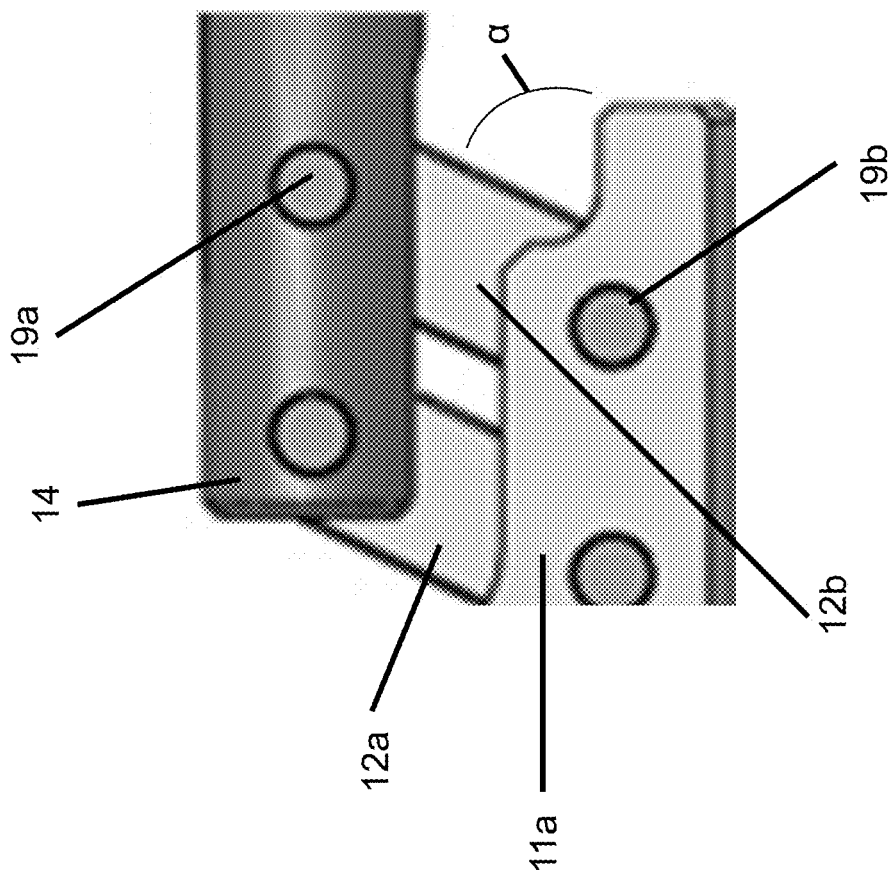

VARIABLE LINEAR MOTOR

FIELD OF THE INVENTION

The present invention relates to motors, in particular a reverse crankshaft motor translating rotational force from a rotational motor into periodic reciprocating force through a crankshaft structure. The crankshaft structure includes a variable linear system designed to enable tuning of the amplitude of the periodic reciprocating force and simultaneous and independent tuning of the frequency of periodic rotational force while the motor is in operation.

BACKGROUND

Certain devices require a periodic reciprocating motion supplied by an outside motor. A rotational motor (powered by heat or electricity, for example) may generate a periodic rotational motion around a fixed axis, which—when combined with a crankshaft—may be converted to a periodic reciprocating motion. The periodic reciprocating motion, supplied from the rotational motor to the external device, may be defined by a number of characteristics. For example, the frequency of the periodic rotational motion may be determined by the force exerted by the rotational motor. Separately, the amplitude of the periodic reciprocating motion may be determined by the geometry of the crankshaft structure. The skilled artisan will recognize that the force required to maintain the ideal periodic reciprocating motion for any specific need will depend, inter alia, on the mass of the object affected by the device, the amplitude of the periodic reciprocating motion and the frequency of the periodic rotational motion. Therefore, it is advantageous to have a motor with adjustable amplitude and frequency as needed for various external devices and particular tasks. Electric motors with tunable amplitudes and frequencies are known in the art. Examples include pneumatic motors, piezoelectric motors, and electro-magnetic voice coil motors.

One problem that arises in the art is providing a range of both frequencies and amplitudes in a single motor. Motors known in the art typically provide more of one and less of the other. For example, pneumatic motors, which convert compressed air to mechanical energy through either linear or rotary motion, may provide a wide amplitude range, including very high amplitudes. However, pneumatic motors have a limited frequency range and a comparatively low maximum frequency. At the other end of the spectrum, piezoelectric motors, which employ a material that can change dimension when a voltage is applied to the material, may provide a broad frequency range, including very high frequencies. However, piezoelectric motors have a limited amplitude range and a comparatively low maximum amplitude.

Another problem that arises in the art is providing independently adjustable frequencies and amplitudes through means that do not restrict each other. Electro-magnetic voice coil (or solenoid) motors, which combine an electrical coil wound around a cylindrical core with a polarized piston, may provide a wide amplitude range as well as a wide frequency range. However, the means of adjusting either the amplitude or frequency of an electro-magnetic voice coil motor inversely affects the other. Thus, as the frequency increases, the amplitude of the periodic reciprocating motion decreases, and vice versa.

Accordingly, it is an object of the invention to provide a motor with a wide amplitude range as well as a wide frequency range. Another objective of the invention is to provide a motor with independently adjustable frequency and amplitude, such that the decrease or increase of one does not affect or limit the other.

SUMMARY OF THE INVENTION

The present invention relates to a reverse crankshaft motor and method for providing independent tuning of amplitude and frequency of the periodic reciprocating motion provided by an amplituder extending to an external secondary device. The reverse crankshaft motor comprises a reverse crankshaft structure that translates periodic rotational motion to periodic reciprocating motion. The reverse crankshaft structure is connected to a rotational motor by a first axle. The reverse crankshaft structure is positioned between a first and second wall and held in place by a first and second shifter. The first and second shifters are affixed to a tuning bolt that extend between the first and second wall. The tuning bolt facilitates adjustment of the first and second shifters relative to each other along the longitudinal axis of the tuning bolt.

The crankshaft structure comprises a first frame, connected to the first axle extending from the motor and through the first wall, and a second frame, connected to a second axle extending from the second wall. The first axle, second axle and crankshaft structure are oriented longitudinally along a common central axis. The first frame and second frame each have an opening and the first and second frames are oriented longitudinally opposite from each other such that the openings face each other. In the space created by the openings of the first and second frame, a third axle is positioned such that the axis of the third axle is substantially parallel with the central axis of the reverse crankshaft motor. The third axle is connected to the interior of the first and second frame by hinges, each of which is attached to the third axle by a first pivot and to each of the first frame and second frame, respectively, by a second pivot. The hinges connecting the third axle to the first frame are oriented at an angle relative to the interior of the first frame that is equal and opposite to the angle of the hinges connecting the third axle to the second frame.

The variable radial distance created by the movement of the third axle is determined by the angles of the hinges to the first and second frames, respectively. In turn, the angle of the hinges is determined by the longitudinal distance between the first and second frames. This distance is adjusted by the knob of the tuning bolt, which in turn adjusts the longitudinal distance between the first and second shifters. In this manner, the operator of the reverse crankshaft motor may adjust the radial motion relative to the central axis, produced by rotation of the third axle.

The third axle is connected to an amplituder that extends in a perpendicular direction to the central axis of the reverse crankshaft motor. The amplituder may also connect to a secondary external device. During the operation of the reverse crankshaft motor, the amplituder will move in a periodic reciprocating motion, the amplitude of which is defined as approximately twice the variable radial distance of the third axle from the central axis of the reverse crankshaft motor. The amplituder thus creates independent movement in a direction perpendicular to the axis of the motor relative to the first and second frames.

The invention also relates to a method of independently adjusting the frequency and amplitude of the reverse crankshaft motor. The frequency may be adjusted by methods known in the art as determined by speed of the rotational motor used in conjunction with the reverse crankshaft motor. The amplitude may be adjusted independently and without affecting—or being substantially affected by—the frequency through adjustment of the tuning bolt, which may be engaged using mechanical or electronic means known in the art. Adjusting the tuning bolt results in movement of the first and second shifters towards or away from each other, which in turn changes the longitudinal distance between the first frame to the second frame which in turn changes the angle of the hinges to the third axle, thereby changing the variable radial distance traveled around the central axis. Adjusting the radial distance of the third axle adjusts the amplitude of the periodic reciprocating motion provided by the amplituder.

DESCRIPTION OF DRAWINGS

FIG. 1A illustrates an enlarged portion of FIG. 1.

DETAILED DESCRIPTION OF THE INVENTION

Figure 1:
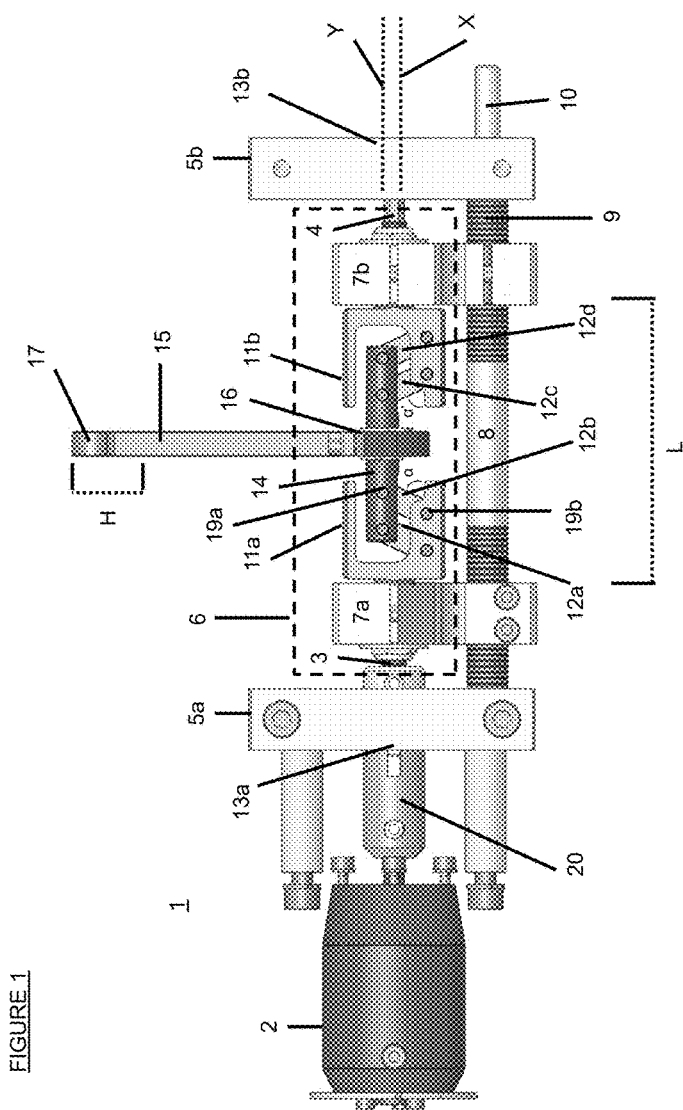
FIG. 1 illustrates the reverse crankshaft motor according to the principles of the invention.

The reverse crankshaft motor of the invention allows the user to adjust the frequency of the rotational motor and the-amplitude produced by the reverse crankshaft structure, separately and independently, while the reverse crankshaft motor is in operation. The reverse crankshaft motor of the invention includes a rotational motor, examples of which are well known in the art. The motor is connected to a crankshaft structure by a first axle. The crankshaft structure is held in place between a first and second wall by a first and a second shifter, each of which are affixed to a tuning bolt that extends through the first and second wall. In one embodiment, the surface of the bolt includes threads oriented to enable the first and second shifters to slide simultaneously towards or away from each other upon axial rotation of the bolt. This adjustment may be controlled remotely or through the operation of a tuning bolt knob located in a position accessible to the user while the reverse crankshaft motor is in operation. For example, the knob may be located at the side opposite the reverse crankshaft motor, positioned to allow easy access by the user through mechanical means. In another embodiment, the first and second shifters may be attached to any mechanism known in the art to change their position relatively towards or away from each other through mechanical means while the reverse crankshaft motor is in operation.

The crankshaft structure further includes a first and second frame. The frames may be any suitable shape known in the art. In one embodiment, the first and second frames may be fully cylindrical or partially cylindrical. Alternatively the frames may be C-shaped or square-C-shaped or other similar structure. The first frame is attached to the first axle extending through an opening in the first wall and connected to the motor. In one embodiment, the first axle may extend into the opening of an axle cylinder, which in turn is connected to the motor. The second frame is attached to a second axle extending through an opening in the second wall. The first axle, second axle and first and second frames are aligned along a central axis. The first and second frames further include a discrete center portion framed by the first and second frames. The first and second frames are oriented such that the openings of the first and second frames face each other. In the space separating the adjacent openings of the first and second frame is a third axle. The third axle has an axis that is parallel to the central axis of the reverse crankshaft motor and produces rotational movement having a variable amplitude from the central axis which is determined by the angular relationship between the first and second frames and the third axle. The third axle is fixedly attached to each of the first and second frames, respectively, by one or more adjustable hinges. The hinges are attached individually to the third axle and the first or second frame.

The reverse crankshaft motor further comprises an amplituder that extends in a perpendicular direction from central axis of the reverse crankshaft motor. The proximal end of the amplituder is affixed to the third axle, while the distal end may be connected to any external device that requires periodic movement at an amplitude and frequency. During the operation of the reverse crankshaft motor, the amplituder moves in a periodic reciprocating motion having an amplitude equal to approximately twice the variable radial distance of the third axle from the central axis of the reverse crankshaft motor. Thus, the amplitude is determined by the orientation of the third axle, with respect to the linear distance between the first and second frames.

Referring now to the drawings wherein the showings are for purposes of illustrating preferred embodiments of the present invention only, and not for purposes of limiting the scope of the invention in any way, FIG. 1 shows one embodiment of the reverse crankshaft motor 1 including a motor 2, which can be any motor providing a rotational force as well known in the art. The motor 2 exerts a force on a longitudinally-aligned axle cylinder 20, which is connected to the motor 2 on one side and provides an opening on the other side. A first axle 3 slidably extends into the opening of the axle cylinder 20. Either the axle cylinder 20 or the first axle 3 (or a combination thereof) extend through an opening 13a of a first wall 5a. The first axle 3 further extends a first shifter 7a to connect with a first frame 11a. The first frame 11a has an opening that faces in the opposite direction from the first axle 3. The first axle 3 is oriented along a central axis X of the reverse crankshaft motor 1. A second axle 4, also oriented along the central axis X, is arranged at the opposite end of the reverse crankshaft motor 1 from the motor 2. The second axle 4 extends through an opening 13b in a second wall 5b and through a second shifter 7b, to connect with a second frame 11b. The second frame 11b has an opening that faces in the opposite direction from the second axle 4. The second frame 11b is arranged longitudinally adjacent to the first frame 11a along the central axis X, in a longitudinally opposite orientation such that the first and second frames 11a, 11b openings face each other and frame a discrete center portion of the crankshaft structure. The second axle 4 and first and second frames 11a, 11b are also oriented along the central axis X.

The first shifter 7a and second shifter 7b are separated by a longitudinal distance L. The first shifter 7a and second shifter 7b are attached to a tuning bolt 8, which extends also through the first wall 5a and second wall 5b. The surface of the bolt 8 further includes threads 9, and the bolt 8 may connect to a knob 10. The knob 10 may provide a means for the user to axially rotate the bolt 8. Alternatively, the tuning bolt 8 may be adjusted by electronic or remote means known in the art. In one embodiment, the threads 9 of the bolt 8 are oriented such that, upon axial rotation of the bolt 8 by application of the knob 10, the first shifter 7a and second shifter 7b slide in opposite directions, either towards each other or away from each other in the linear direction. The linear movement of the first and second shifters 7a, 7b in turn adjusts the location of the first and second frames 11a, 11b relative to each other in the linear direction.

The first and second frames 11a, 11b form part of a crankshaft structure 6, which further includes a third axle 14 located partially within the center portion framed by the first and second frames 5a, 5b. The third axle 14 is attached to the interior of the first frame 11a and also the interior of the second frame 11b by hinges 12a-d. The third axle 14 is oriented such that it has a secondary axis Y that is substantially parallel to the central axis X of the reverse crankshaft motor 1. Hinges 12a and 12b connect the third axle 14 to the interior of the first frame 11a, thus forming a first angle α between the hinges 12a, 12b and the first frame 11a. Hinges 12c and 12d connect the third axle 14 to the interior of the second frame 11b, thus forming a second angle α' between the hinges 12c, 12d and the second frame 11b. The number of hinges may vary depending on the dimensions of the reverse crankshaft structure and other parameters. The first and second angles α, α' determine the variable radial distance from the third axle 14 to the central axis X. In one embodiment, the third axle 14 is arranged such that, when the first and second angles α, α' are approximately at 90°, the radial distance between the central axis X and the secondary axis Y of the third axle 14 is at a maximum, thereby generating maximum amplitude.

The third axle 14 is connected to an amplituder 15, which has a proximal end 16 and a distal end 17. The proximal end 16 is understood to be the end that connects to the third axle 14, and the distal end 17 may connect with a separate device exterior to the reverse crankshaft motor 1. The amplituder 15 extends at an angle perpendicular to the central axis X of the reverse crankshaft motor 1. Because the amplituder 15 is attached to the third axle 14, the rotation of the third axle 14 generates a repetitive back-and-forth movement, or periodic reciprocating motion, of the amplituder 15. The distance H traveled by the amplituder 15 is defined as twice the variable radial distance from the secondary axis Y of the third axle 14 to the central axis X.

FIG. 1A shows an enlarged portion of the reverse crankshaft motor 1, including the hinge mechanism 18 that provides the means of connecting the third axle 14 to one of the first or second frame 11a, 11b. Each hinge 12a-d is connected to the third axle 14 by a first pivot 19a at one end of the hinge, and to each of the first and second frame 11a, 11b by a second pivot 19b. Thus, each hinge 12a-d may move relative to both the third axle 14 and the first and second frames 11a, 11b.

Figure 2:
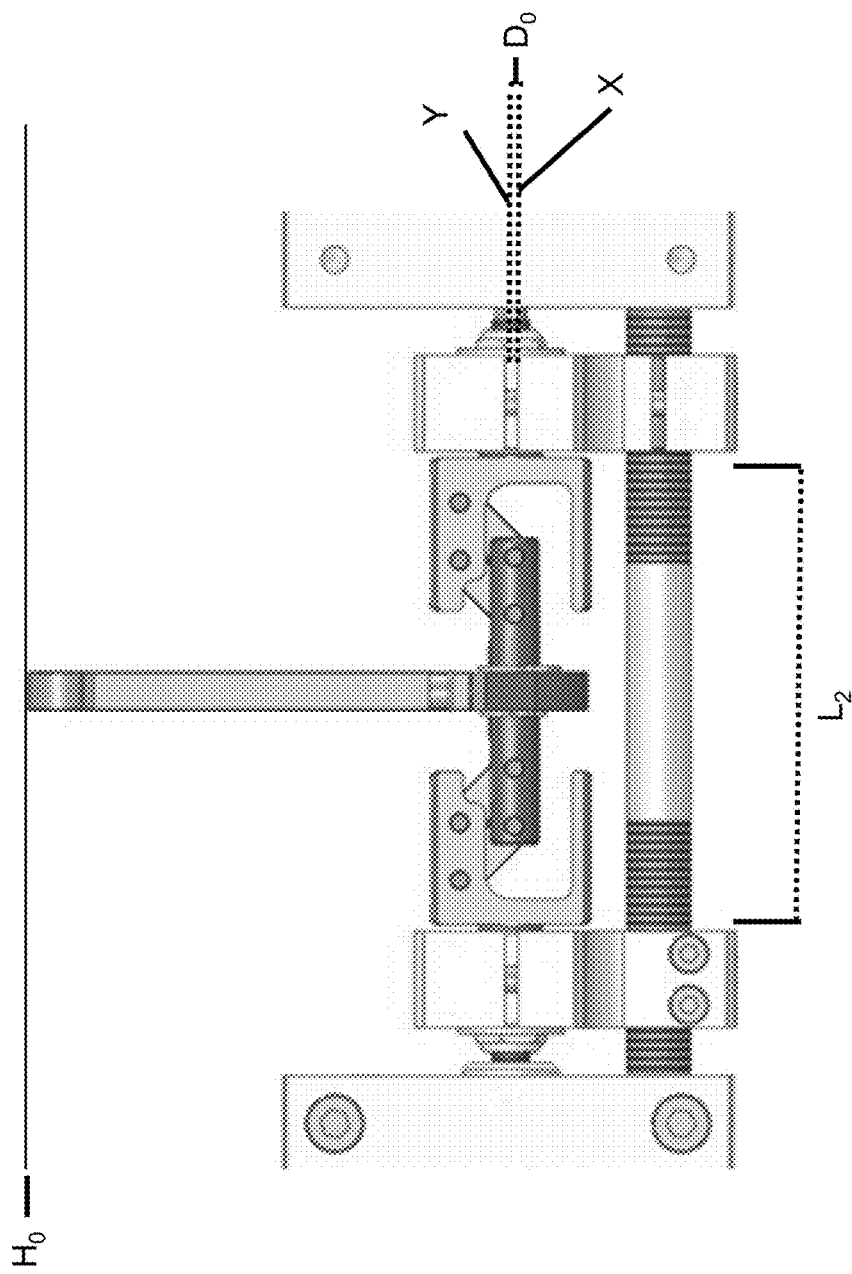
FIG. 2 illustrates the reverse crankshaft motor at a stage of minimum amplitude as the first and second frames are separated to such a degree that the axis of the third axle is substantially aligned with the central axis of the reverse crankshaft motor.

The invention also relates to a method of increasing the amplitude of periodic reciprocating motion of the amplituder 15 independent of the frequency of the periodic rotational force exerted by the motor 2 while the reverse crankshaft motor 1 is in operation. FIG. 2 shows the reverse crankshaft motor 1 set for minimal amplitude. The first shifter 7a and second shifter 7b are oriented at a maximum longitudinal distance $L_2$ from each other; thus, the first frame 11a and second frame 11b are at a maximum distance away from each other. As the distance between the first frame 11a and second frame 11b increases, the first and second angles α, α' decrease. In this embodiment, when the first and second angles α, α' are at the lowest possible angle, the third axle 14 is oriented such that the secondary axis Y of the third axle 14 is substantially aligned with the central axis X of the reverse crankshaft motor 1. In this configuration, the minimum radial distance $D_0$, representing the radial distance between the central axis X and the secondary axis Y is substantially zero. Thus, the distance $H_0$ traveled by the proximal end 16 of the amplituder 15, approximating twice the value of the minimum radial distance $D_0$, is also substantially zero. In this way, amplitude may be minimized.

Figure 3:
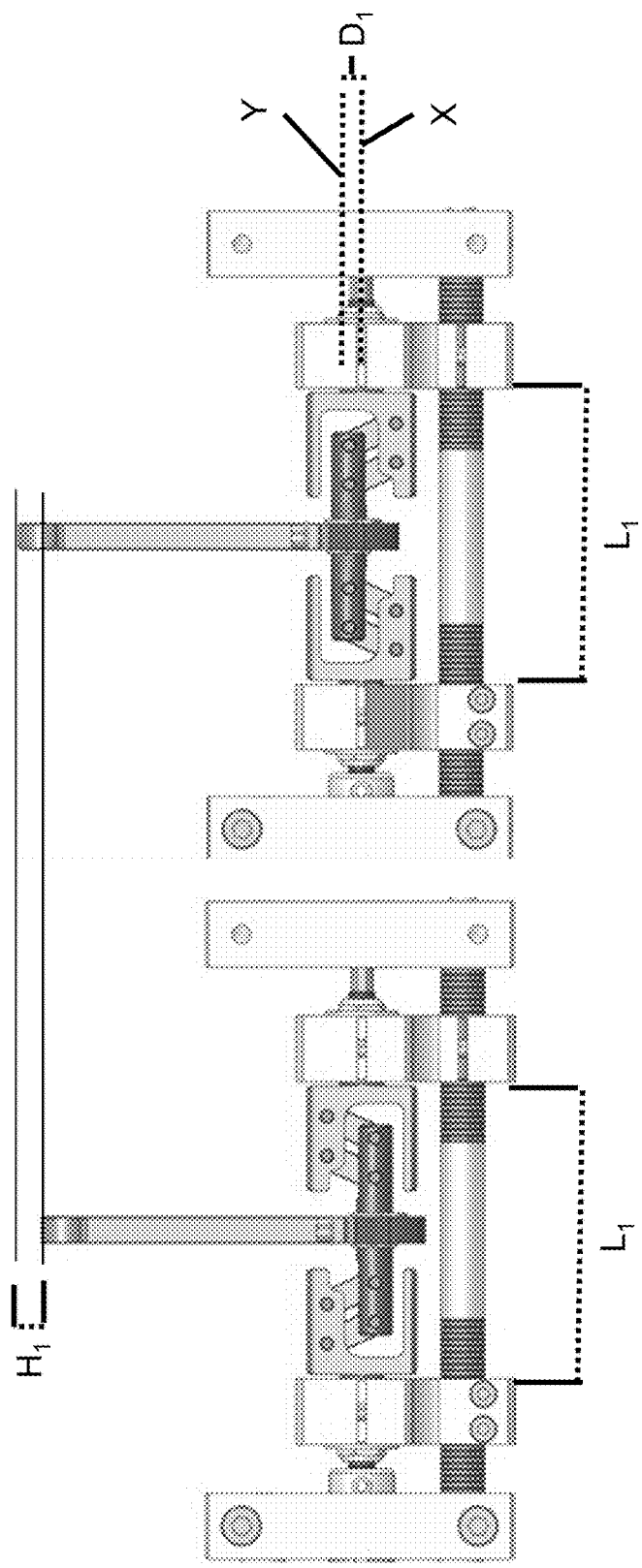
FIG. 3 illustrates the reverse crankshaft motor at a stage of intermediate amplitude as the first and second frames are separated to such a degree that the axis of the third axle is at an intermediate radial distance from the central axis of the reverse crankshaft motor.

FIG. 3 shows the reverse crankshaft motor 1 set for an intermediate amplitude. The first shifter 7a and second shifter 7b are oriented at an intermediate longitudinal distance $L_1$ from each other; thus, the first frame 11a and second frame 11b are at an intermediate distance away from each other. In this position, the first and second angles α, α' are at an intermediate degree and the third axle 14 is oriented such that the secondary axis Y is at a radial distance greater than $D_0$, represented as a variable intermediate radial distance $D_1$, from central axis X. As the crankshaft structure 6 rotates, the proximal end 16 of the amplituder 15 travels in a periodic reciprocating motion over the intermediate distance $H_1$, approximating twice the variable intermediate radial distance $D_1$.

Figure 4:
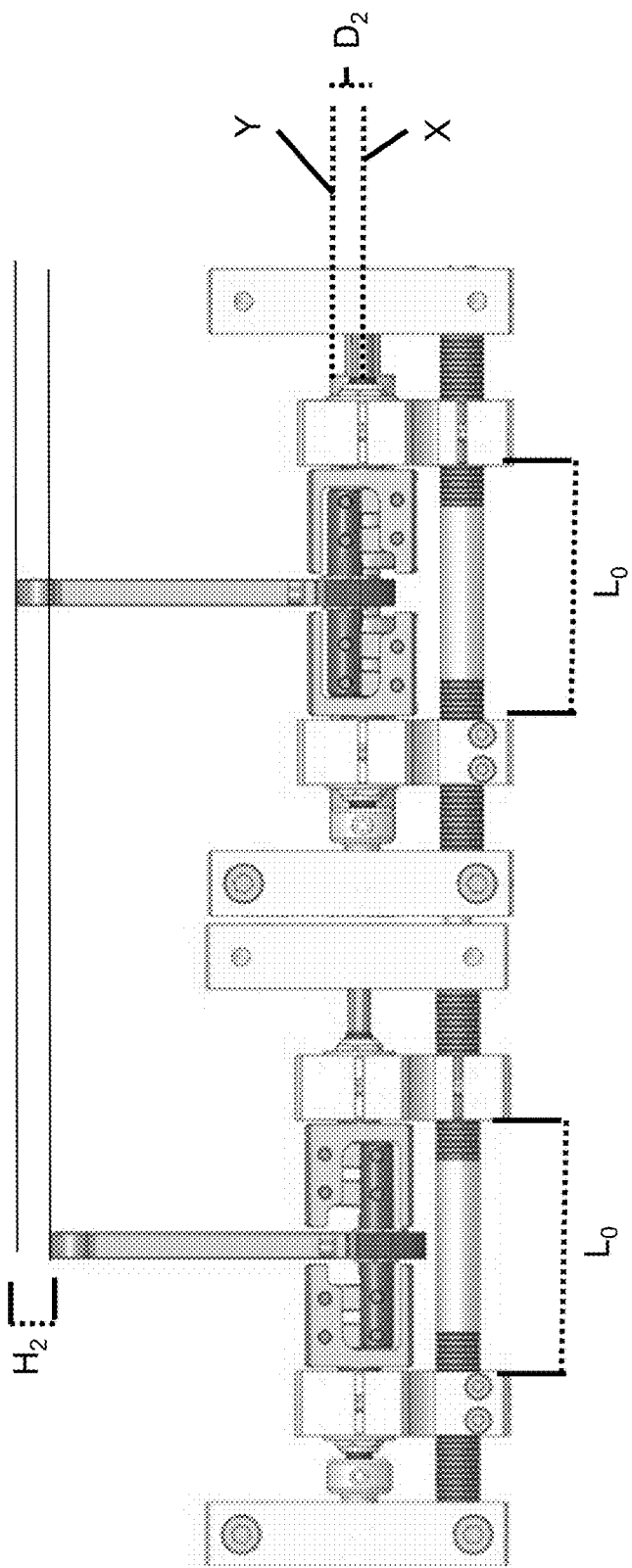
FIG. 4 illustrates the reverse crankshaft motor at a stage of maximum amplitude as the first and second frames are aligned such that an approximately 90° angle is formed between the hinges and interior of the first or second frame, and the axis of the third axle is at the maximum possible radial distance from the central axis of the reverse crankshaft motor.

FIG. 4 shows the reverse crankshaft motor 1 set for the maximum amplitude. The first shifter 7a and second shifter 7b are oriented at the minimum longitudinal distance $L_0$ from each other; thus, the first frame 11a and second frame 11b are positioned close together. In this position, the first and second angles α, α' are at maximum degree (here shown as 90° angles) and the third axle 14 is oriented such that the secondary axis Y is at the maximum radial distance from central axis X, represented by radial distance $D_2$. As the crankshaft structure 6 rotates, the proximal end 16 of the amplituder 15 travels in a periodical reciprocating motion over the maximum possible distance $H_2$, approximating twice the radial distance $D_2$. The range of amplitude defined by $H_0$ to $H_2$ may be configured to any specification as needed by the application of the reverse crankshaft motor.

The variable intermediate radial distance $D_1$ (and, by extension, intermediate distance $H_1$) may be any value between the minimum radial distance $D_0$ and the maximum radial distance $D_2$, depending on the positions of the first and second shifters relative to each other as determined by the user during operation of the reverse crankshaft motor.

As the first frame 11a and second frame 11b move closer together or further apart, the first axle 3 and the second axle 4 may adjust their position relative to the motor 2 and/or to the first wall 5a and second wall 5b. In one embodiment, the first axle 3 slides further into or out of the opening of the axle cylinder 20 as the shifters adjust position. The axle cylinder 20 may also adjust position relative to the motor 2 and/or the first wall 5a. The opening 13a of the first wall 5a is arranged to accommodate lateral movement of the first axle 3 and/or axle cylinder 20 while maintaining the first axle 3 along the central axis X without hampering the rotation of first axle 3. Likewise, the second axle 4 may slide further into and/or through the opening 13b of the second wall 5b as the shifters adjust position. The opening 13b of the second wall 5b is arrange to accommodate lateral movement of the second axle 4 while maintaining the second axle 4 along the central axis X without hampering the rotation of the second axle 4. The adjustment of the first axle 3 and second axle 4, and/or the axle cylinder 20, occurs through means known in the art to accommodate the change in position of the first frame 11a and second frame 11b relative to each other.

The broad range of frequency and amplitude enabled by the rotational motor of the invention, each independently adjustable without affecting or limiting the other, provide an advantage by expanding the types of devices suitable for use with this motor. Further, the capacity to independently tune amplitude and frequency of a reverse crankshaft motor provides an advantage by allowing fine tuning of sensitive instruments while in operation without the necessity of pausing the rotational force and/or dismantling or replacing components in the middle of an operation. The method of adjusting amplitude of a reverse crankshaft motor is advantageous compared to other methods known in the art because delicate projects, such as, inter alia, drilling during invasive surgeries, are often not conducive to removing and replacing instruments to respond to changing conditions. The motor may be any motor providing rotational force, which are well known in the art. Furthermore, any secondary external device may be utilized in connection with the present invention. In one example, the external device consists of a jack-hammer-like device used for endovascular procedures; however, it should be understood that the invention is not limited to any particular external device.

It will be appreciated by persons having ordinary skill in the art that many variations, additions, modifications, and other applications may be made to what has been particularly shown and described herein by way of embodiments, without departing from the spirit or scope of the invention. Therefore it is intended that scope of the invention, as defined by the claims below, includes all foreseeable variations, additions, modifications or applications.

The invention claimed is:

1. A reverse crankshaft motor comprising:
   a) a motor having a first axle, said first axle aligned along a central axis of the reverse crankshaft motor;
   b) a crankshaft structure connected to said motor by said first axle, said crankshaft structure comprising a first frame, a second frame and a third axle arranged between said first and second frames and connected thereto, wherein said third axle has an axis that is parallel with said central axis and wherein said third axle further has an adjustable radial distance from said central axis; and
   c) an amplituder having a proximal end and a distal end, wherein the proximal end is affixed perpendicularly to said third axle.

2. The reverse crankshaft motor of claim 1, wherein the amplituder is further characterized by an amplitude of reciprocating motion.

3. The reverse crankshaft motor of claim 1, wherein the second frame is connected to a second axle, wherein said second axle is aligned along the central axis of the reverse crankshaft motor.

4. The reverse crankshaft motor of claim 1, wherein the crankshaft structure is arranged between a first shifter and a second shifter.

5. The reverse crankshaft motor of claim 4, wherein the first and second shifter are affixed to a tuning bolt.

6. The reverse crankshaft motor of claim 5, said bolt having threads arranged such that, upon rotation of the bolt, the first and second shifter slide in opposite directions.

7. The reverse crankshaft motor of claim 5, wherein the bolt further comprises a knob, said knob configured to rotate the bolt.

8. The reverse crankshaft motor of claim 5, further comprising a motor connected to said bolt.

9. The reverse crankshaft motor of claim 1, wherein said crankshaft structure further comprises a first hinge mechanism, wherein one or more hinges of the first hinge mechanism is connected to the third axle by a first pivot and said one or more hinges of the first hinge mechanism is connected to the first frame by a second pivot.

10. The reverse crankshaft motor of claim 9, wherein said crankshaft structure further comprises a second hinge mechanism, wherein one or more hinges of the second hinge mechanism is connected to the third axle by a third pivot and said one or more hinges of the second hinge mechanism is connected to the second frame by a fourth pivot.

11. The reverse crankshaft motor of claim 10, wherein said first and second hinges are arranged such that, as the distance between the first and second frames decrease, said radial distance increases.

12. The reverse crankshaft motor of claim 2, wherein as the radial distance increases, said amplitude increases.

13. The reverse crankshaft motor of claim 1, wherein the first axle extends into the opening of an axle cylinder, wherein said axle cylinder is connected directly to the motor.

14. A method of adjusting an amplitude of the reverse crankshaft motor of claim 1, comprising the steps of:
   a) operating the motor;
   b) moving the first frame towards the second frame; thereby adjusting the radial distance of the third axle form the central axis of the reverse crankshaft motor, thereby adjusting the amplitude generated by the reverse crankshaft motor.

15. The method of claim 14 wherein said first frame and second frame are affixed to a tuning bolt comprising a knob, further comprising the step of: moving the first frame towards the second frame by operating the knob.

16. The method of claim 14 wherein said amplituder is characterized by an amplitude of reciprocating motion, further comprising the step of: adjusting said amplitude.

17. The method of claim 14, further comprising the step of: adjusting the frequency of the reverse crankshaft motor by operating the motor.

18. The method of claim 17, further comprising the step of: maintaining a consistent amplitude generated by the reverse crankshaft motor during adjustment of the frequency of the reverse crankshaft motor.

* * * * *